(12) United States Patent
Nguyen et al.

(10) Patent No.: US 6,188,206 B1
(45) Date of Patent: Feb. 13, 2001

(54) DYNAMIC HYSTERESIS VOLTAGE REGULATION

(75) Inventors: Don J. Nguyen, Portland; Thovane Solivan, Hillsboro, both of OR (US)

(73) Assignee: Intel Corporation, Santa Clara, CA (US)

( * ) Notice: Under 35 U.S.C. 154(b), the term of this patent shall be extended for 0 days.

(21) Appl. No.: 09/457,488

(22) Filed: Dec. 8, 1999

(51) Int. Cl.[7] .................................................. G05F 1/613
(52) U.S. Cl. ............................ 323/222; 323/283; 323/284
(58) Field of Search ..................................... 323/222, 282, 323/283, 284; 363/84, 89

(56) References Cited

U.S. PATENT DOCUMENTS

| | | | |
|---|---|---|---|
| 4,761,725 | * 8/1988 | Henze | 323/283 |
| 5,072,355 | * 12/1991 | Hvillet | 363/89 |
| 5,079,498 | * 1/1992 | Cleasley et al. | 323/283 |
| 5,731,694 | * 3/1998 | Wilcox et al. | 323/283 |
| 5,808,455 | * 9/1998 | Schwartz et al. | 323/283 |
| 5,949,226 | * 9/1999 | Tanaka et al. | 323/283 |
| 5,959,443 | * 9/1999 | Little Field | 323/284 |
| 5,969,515 | * 10/1999 | Oglesbee | 323/283 |
| 6,020,729 | * 2/2000 | Stratokos et al. | 323/284 |

* cited by examiner

*Primary Examiner*—Jeffrey Sterrett
(74) *Attorney, Agent, or Firm*—Fish & Richardson P.C.

(57) ABSTRACT

A dynamic switching voltage regulator includes a load indicator, power switches, and a controller. The load indicator generates a load signal responsive to different output load conditions of the regulator. The controller receives the load signal and drives the power switches at a first switching frequency. The controller changes the switching frequency to a second frequency in response to a change in the load signal.

19 Claims, 8 Drawing Sheets

# DYNAMIC HYSTERESIS VOLTAGE REGULATION

BACKGROUND

This disclosure relates to voltage regulators and more specifically, to a hysteretic mode synchronous buck voltage regulator.

A voltage regulator converts an input voltage to a regulated output voltage. Although there are many types and applications for voltage regulators, one such type is a switching, DC-to-DC, step-down voltage regulator, or "buck" regulator. The switching regulator is often chosen due to its small size and efficiency. An example of a typical application is a battery-powered electronic device such as a portable computer. In an example such as this, a voltage regulator is required to provide a predetermined and constant output voltage to a load from an often-fluctuating input voltage source, the battery.

A hysteretic-mode voltage regulator works by regulating the output voltage according to a particular hysteresis level or output voltage ripple. A hysteretic controller in the voltage regulator maintains the output voltage within a hysteresis band centered about the internal reference voltage. The level of hysteresis or ripple is fixed through the entire load range of the voltage regulator.

In a switching regulator, the field-effect transistors (FETs) switch on and off to maintain a certain switching frequency. During this switching time, the transistors enter a linear region where much power is dissipated because the FETs are sourcing current.

SUMMARY

The inventors noticed that when the voltage regulator is heavily loaded, average transition FET power dissipation increases in response to an increase in switching frequency. However, when the voltage regulator is lightly loaded, the transition FET power dissipation becomes negligible compared to an inductor ripple current. An increase in the ripple current causes magnetic inductor core loss and output capacitor equivalent-series-resistance (ESR) loss. Thus, when the regulator is lightly loaded, the inductor ripple current increases in response to a decrease in switching frequency. Therefore, it is advantageous to vary the switching frequency of the regulator according to the load indication. This ability to vary the switching frequency significantly reduces the quiescent power dissipation of the voltage regulator.

A dynamic switching voltage regulator includes a load indicator, power switches, and a controller. The load indicator generates a load signal responsive to different output load conditions of the regulator. The controller receives the load signal and drives the power switches at a first switching frequency. The controller changes the switching frequency to a second frequency in response to a change in the load signal.

BRIEF DESCRIPTION OF THE DRAWINGS

Different aspects of the disclosure will be described in reference to the accompanying drawings wherein.

DESCRIPTION OF THE PREFERRED EMBODIMENTS

Figure 1:
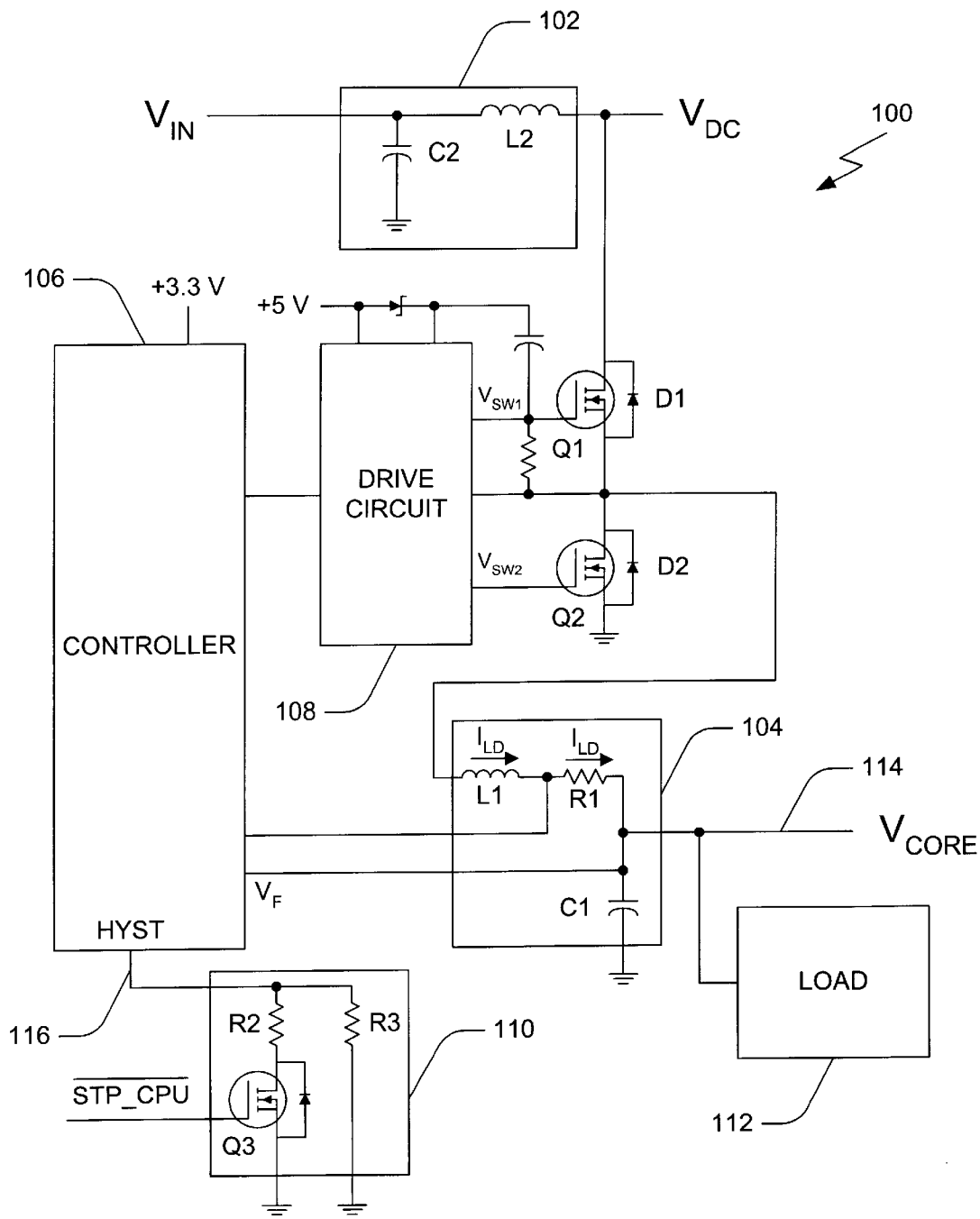
FIG. 1 is a simplified schematic diagram of a dynamic hysteretic-mode synchronous buck voltage regulator.

FIG. 1 is a simplified schematic diagram of a dynamic hysteretic-mode synchronous buck voltage regulator 100. The regulator is connected to an output load 112. The dynamic hysteretic- or ripple-mode voltage regulator 100 includes an input filter 102, a pair of metal-oxide silicon field-effect transistors (MOSFETs) Q1 and Q2, an output filter 104, and a controller 106 that provides the synchronous switching function.

The controller 106 often interacts with a drive circuit 108 to generate non-overlapping switching voltages, $V_{SW1}$ and $V_{SW2}$. The switching voltages control operations of complementary MOSFETs Q1 and Q2, respectively. The voltage regulator 100 also includes a load indicator 110 that generates an output signal in response to a load indication. The output signal indicates whether the voltage regulator 100 is lightly or heavily loaded. This signal asserts an input pin of the controller 106 to change the hysteretic level and the switching frequency.

The load indicator 110 receives a load indication signal, $\overline{STP\_CPU}$, from a processor. The load indication signal is asserted logical high when the regulator output 114 is heavily loaded and is de-asserted logical low when the regulator output 114 is lightly loaded. The signal drives the gate terminal of the n-channel MOSFET switch Q3. When the load signal is asserted, the switch Q3 closes. This drives the load indicator output 116 to logic high. When the signal is de-asserted, the switch Q3 opens. This drives the load indicator output 116 to a logic low through a resistor R2.

During the operation of the ripple-mode voltage regulator 100, the controller 106 controls the output voltage, $V_{CORE}$. If the output voltage falls below the regulation level, the controller 106 turns on Q1 and turns off Q2. This configuration charges inductor L1 in the output filter 104 and feeds the output load 112. When the output voltage exceeds the regulation level, the controller 106 turns off Q1 to begin an interval during which energy is transferred from the inductor L1 to the bulk capacitor C1. After the switch Q1 is turned off, the diode D2 conducts and allows energy to be transferred from the inductor L1 and to the output load 112. A short time after the controller 106 de-asserts the $V_{SW1}$ voltage, the controller 106 asserts the $V_{SW2}$ voltage to turn on the switch Q2. The closed switch Q2, in turn, shunts the diode D2, and reduces the effective resistance path for the $I_{LD}$ current. Shunting of the diode D2 reduces the power that is otherwise dissipated by the diode. This maintains continuous power delivery during the on and off states of Q1.

The controller 106 also ensures that power MOSFETs Q1 and Q2 are never on simultaneously. This condition would place a momentary short across the input power bus and result in lower efficiencies. The condition could also overload, and also potentially destroy the switching devices.

Figure 2:
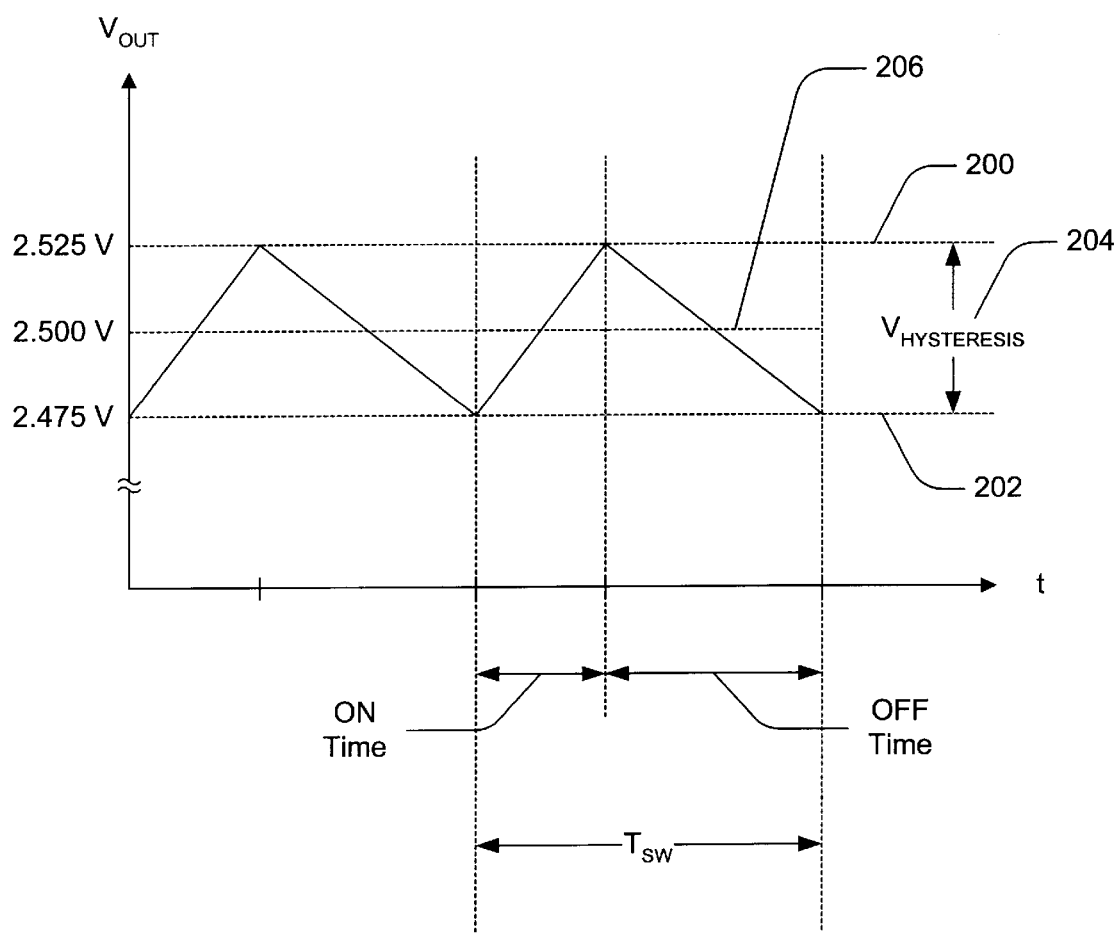
FIG. 2 is a simplified representation of hysteretic-mode switching frequency control.

A simplified representation of hysteretic control is shown in FIG. 2. When the output voltage is below the level of the reference 206 minus one-half of the hysteresis (low limit) 202, the controller turns on Q1 and turns off Q2. This is the power stage ON state. It causes the output voltage to increase. When the output voltage reaches or exceeds the reference 206 plus one-half of the hysteresis (high limit) 200, the controller turns off Q1 and turns on Q2. This is the power stage OFF state. It causes the output voltage to decrease. This hysteretic method of converter control keeps the output voltage within the hysteresis band 204 around the reference voltage 206.

If output-load current ($I_{LD}$) steps or input-voltage ($V_{IN}$) transients force the output voltage out of the hysteresis band 204, the controller 106 sets the power-stage MOSFETs in the continuous ON or OFF state, as required, to return the output voltage to the hysteresis band 204. Thus, the output voltage is corrected as quickly as the output filter allows.

FIGS. 3A through 3D illustrate two exemplary energization/de-energization cycles that last from time $T_0$ to $T_2$ and $T_2$ to $T_4$. The controller 106 interacts with the drive circuit 108 to assert the $V_{SW1}$ voltage at time $T_0$ (at 300). The assertion of the $V_{SW1}$ voltage causes the switch Q1 to close. The $I_{LD}$ current has a positive slope at 302, as energy is being stored in the inductor L1 from time $T_0$ to time $T_1$. Also during the interval from time $T_0$ to $T_1$, the $V_F$ voltage rises upwardly from the lower threshold voltage to the upper threshold voltage at 304. The controller 106 detects this occurrence and responds by interacting with the drive circuit 108 to de-assert the $V_{SW1}$ voltage to open the switch Q1.

The opening of the switch Q1 begins an interval during which energy is transferred from the inductor L1 to the bulk capacitor C1. The $I_{LD}$ current assumes a negative slope from time $T_1$ to $T_2$ at 306. A short time after the controller 106 de-asserts the $V_{SW1}$ voltage, the controller 106 asserts the $V_{SW2}$ voltage at 308 to close the switch Q2.

The controller 106 asserts the $V_{SW2}$ voltage from time $T_1$ to $T_2$ to allow energy to be transferred from the inductor L1. This transfer of energy causes the $V_F$ voltage (and the $V_{CORE}$ voltage) to decrease from the upper threshold to the low threshold at 310. When the VF voltage reaches the lower threshold at time $T_2$ the controller 106 interacts with the drive circuit 108 to de-assert the voltage, which, in turn, causes the switch Q2 to open. A short time thereafter, the controller 106 closes the switch Q1 to begin another energization/de-energization cycle from $T_2$ to $T_4$.

The controller 106, in the above process, fixes the switching frequency, $f_{SW}$, by controlling the hysteretic voltage level, $V_{HYST}$.

Figure 3A:
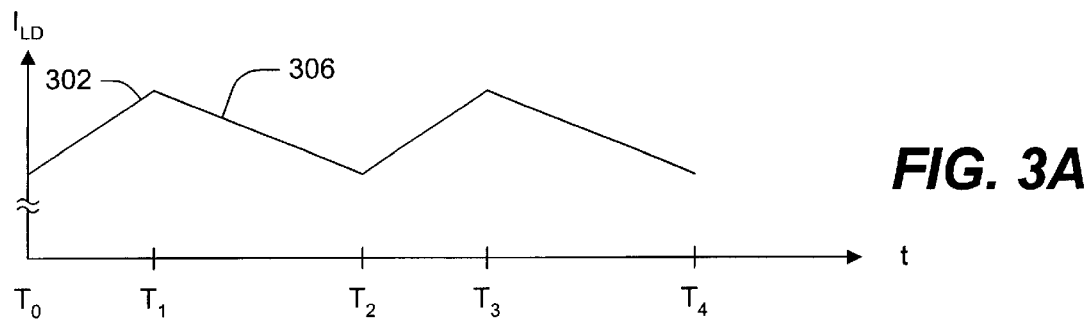
FIGS. 3A through 3D illustrate two exemplary energization/de-energization cycles that last from time $T_0$ to $T_4$.
Figure 3B:
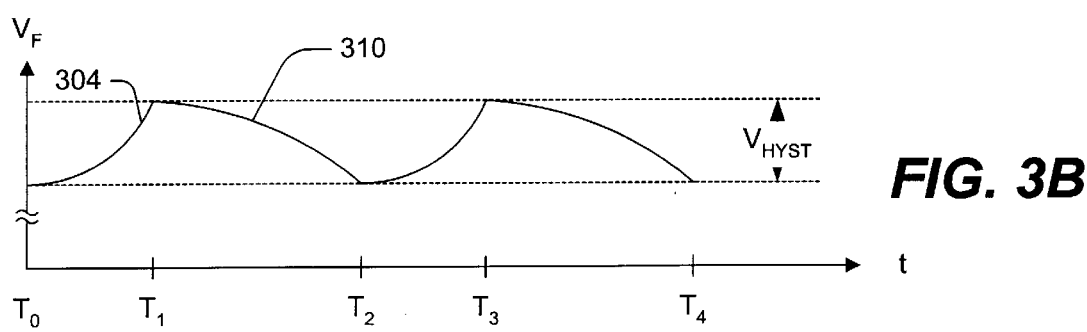
Figure 3C:
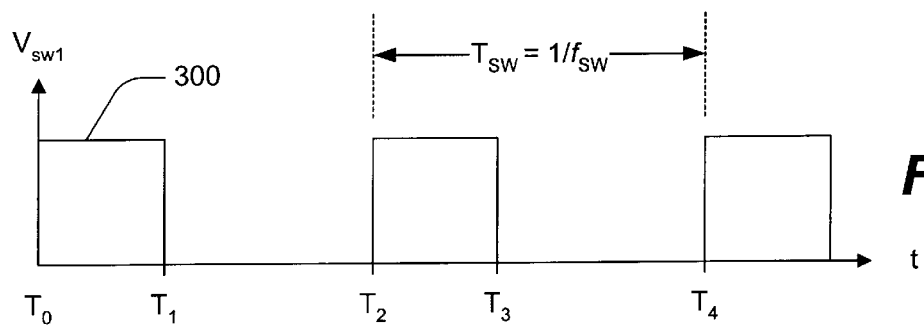
Figure 3D:
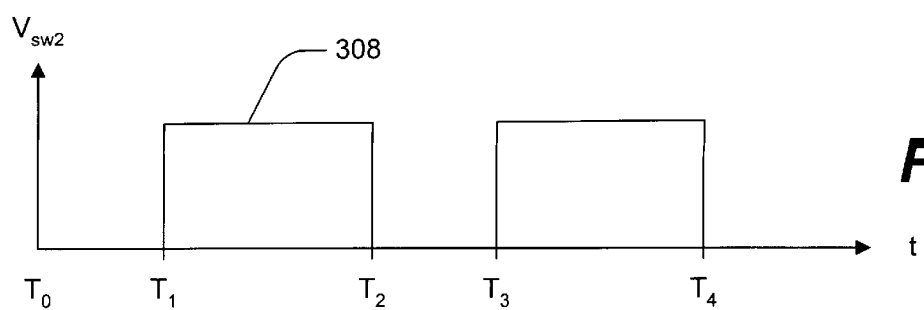
Figure 4A:
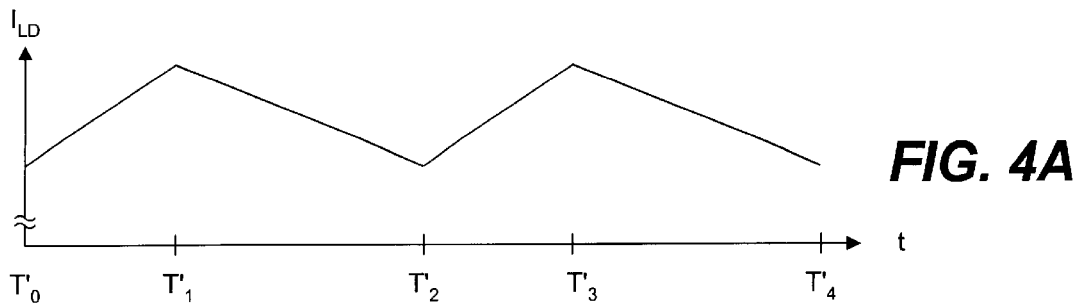
FIGS. 4A through 4D show a decreased switching frequency, lower than the frequency generated in FIG. 3C, in response to an increase in the hysteretic voltage level.
Figure 4B:
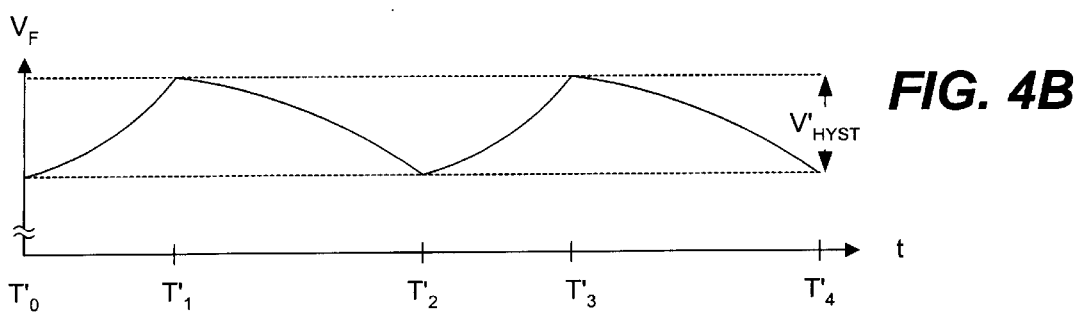
Figure 4C:
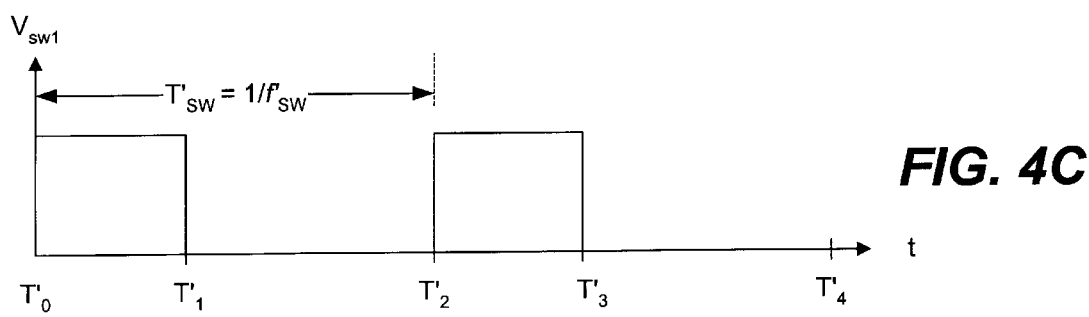
Figure 4D:
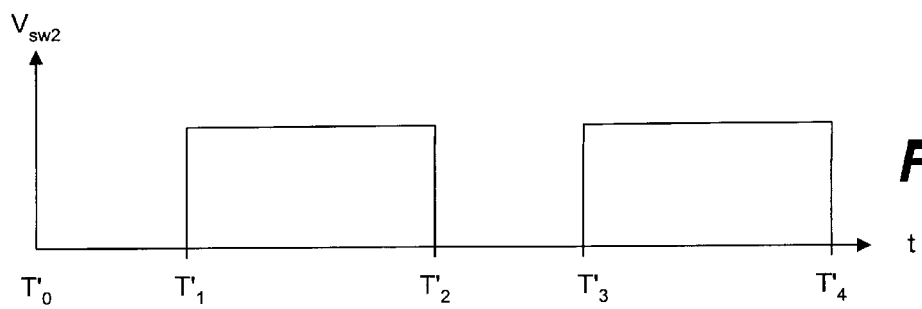

FIGS. 4A through 4D show a decreased switching frequency, $f'_{SW}$ in response to an increase in the hysteretic voltage level, $V'_{HYST}$. FIG. 4B shows a higher ripple voltage level than the voltage level shown in FIG. 3B. This results in the switching frequency $f'_{SW}$ (shown in FIG. 4C) being higher than the switching frequency $f_{SW}$ generated in FIG. 3C.

Figure 5A:
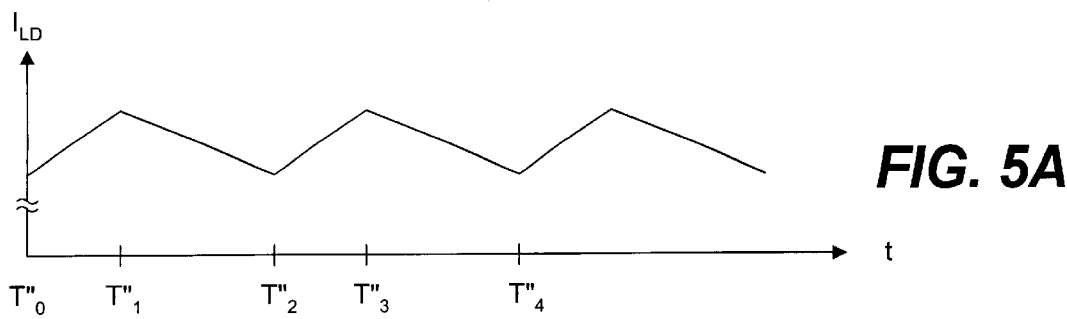
FIGS. 5A through 5D show an increased switching frequency in response to a decrease in the hysteretic voltage level.
Figure 5B:
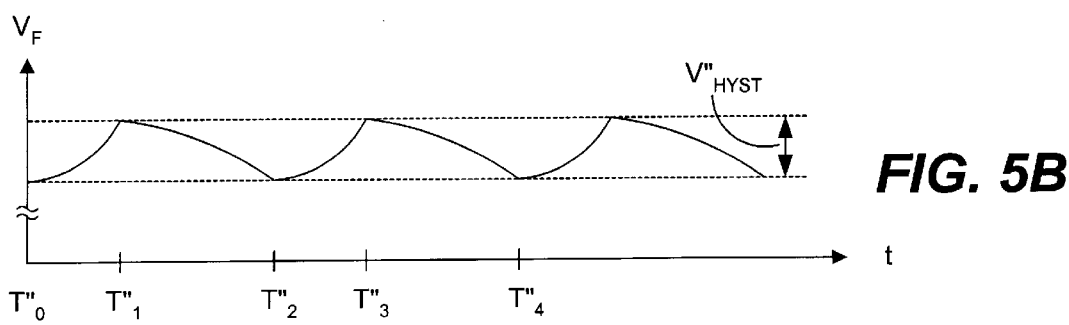
Figure 5C:
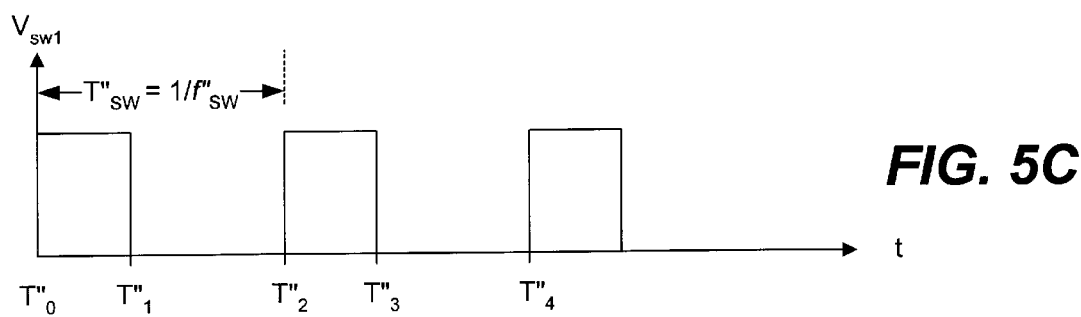
Figure 5D:
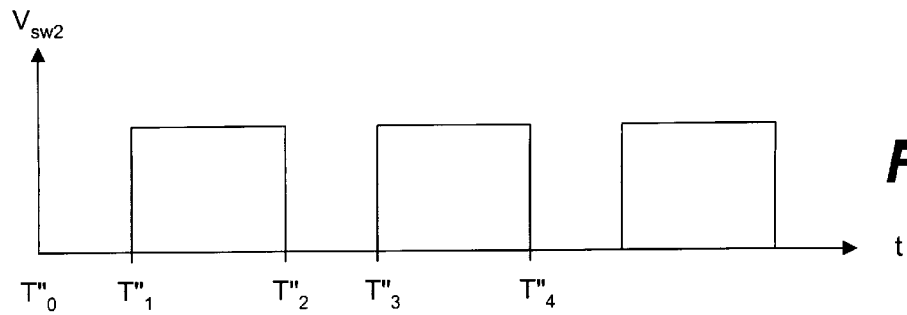

Similarly, FIGS. 5A through 5D show an increased switching frequency, $f''_{SW}$, that is higher than the switching frequency generated in FIG. 3C. The increased frequency is generated in response to a decrease in the hysteretic voltage level, $V''_{HYST}$. FIG. 5B shows a lower ripple voltage level than the level shown in FIG. 3B. FIGS. 5C and 5D indicate a higher switching frequency.

Figure 6:
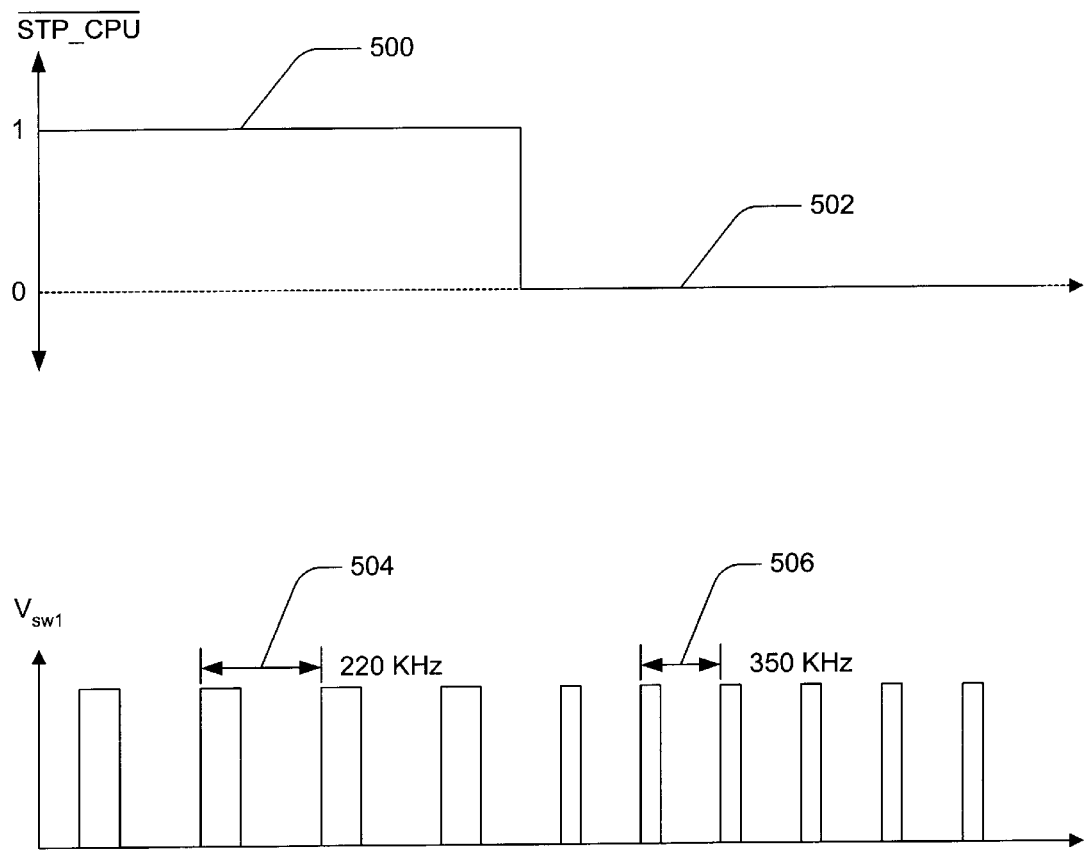
FIG. 6 shows a change in switching frequency in response to the change in load indication signal.

In one embodiment, shown in FIG. 6, the load indication signal ($\overline{STP\_CPU}$) is asserted at 500, which indicates a heavy load. During this period, the controller 106 runs the switching frequency of the $V_{SW1}$ voltage at 220 KHz (at 504). When the load indication signal is de-asserted at 502, indicating a light load, the controller 106 increases the switching frequency to 350 KHz at 506.

Figure 7:
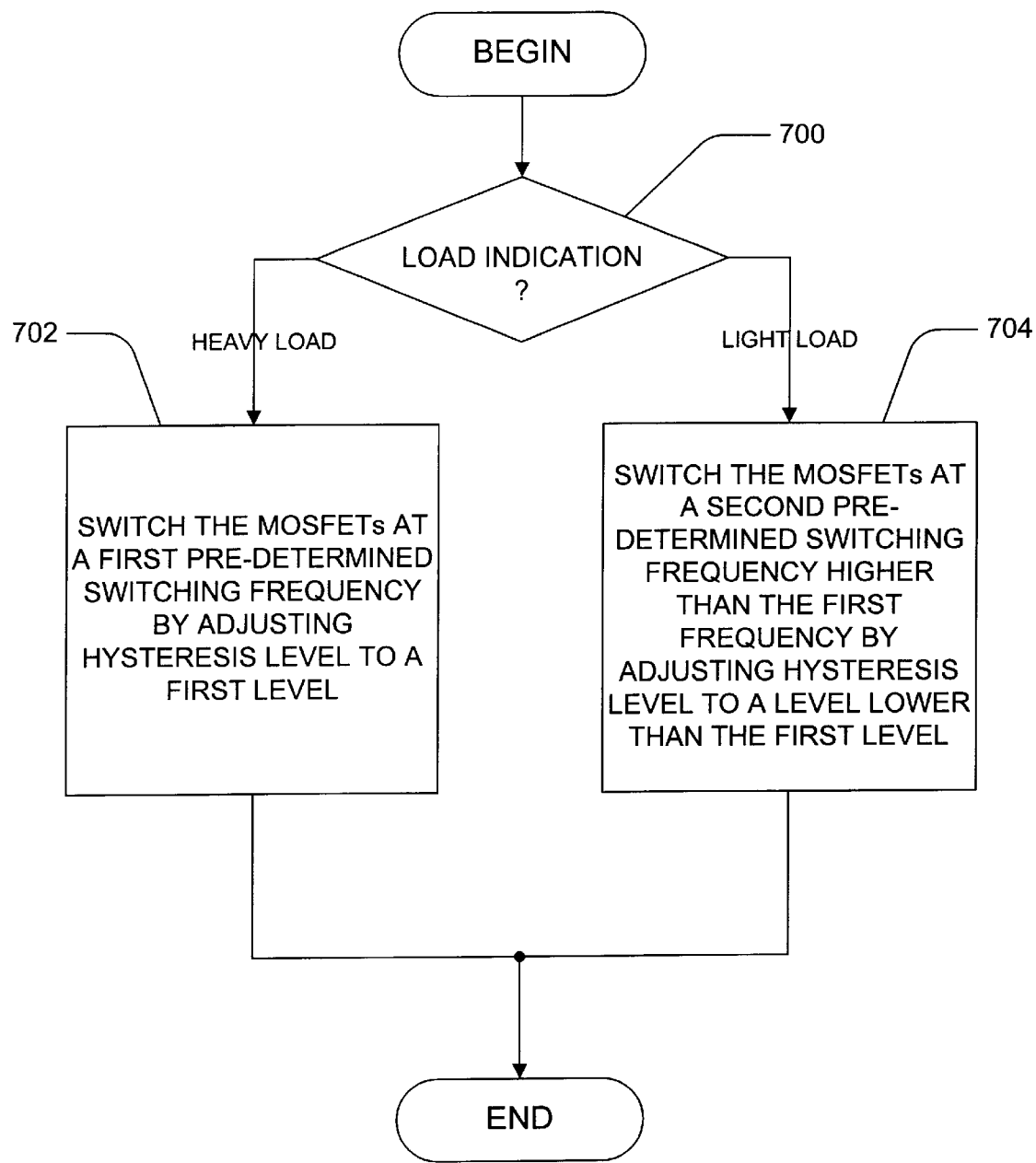
FIG. 7 is a flow diagram of the switching frequency adjustment process.

FIG. 7 is a flow diagram of the switching frequency adjustment process residing in the controller 106. If the load indication signal ($\overline{STP\_CPU}$) indicates a heavy load at 700, the controller 106 switches the MOSFETs at a first predetermined switching frequency by adjusting the hysteresis level to a first level at 702. On the other hand, if the load indication signal indicates a light load at 700, the controller 106 switches the MOSFETs at another predetermined switching frequency higher than the first frequency at 704. Adjusting the hysteresis to a level lower than the first level generates the higher frequency.

Figure 8:
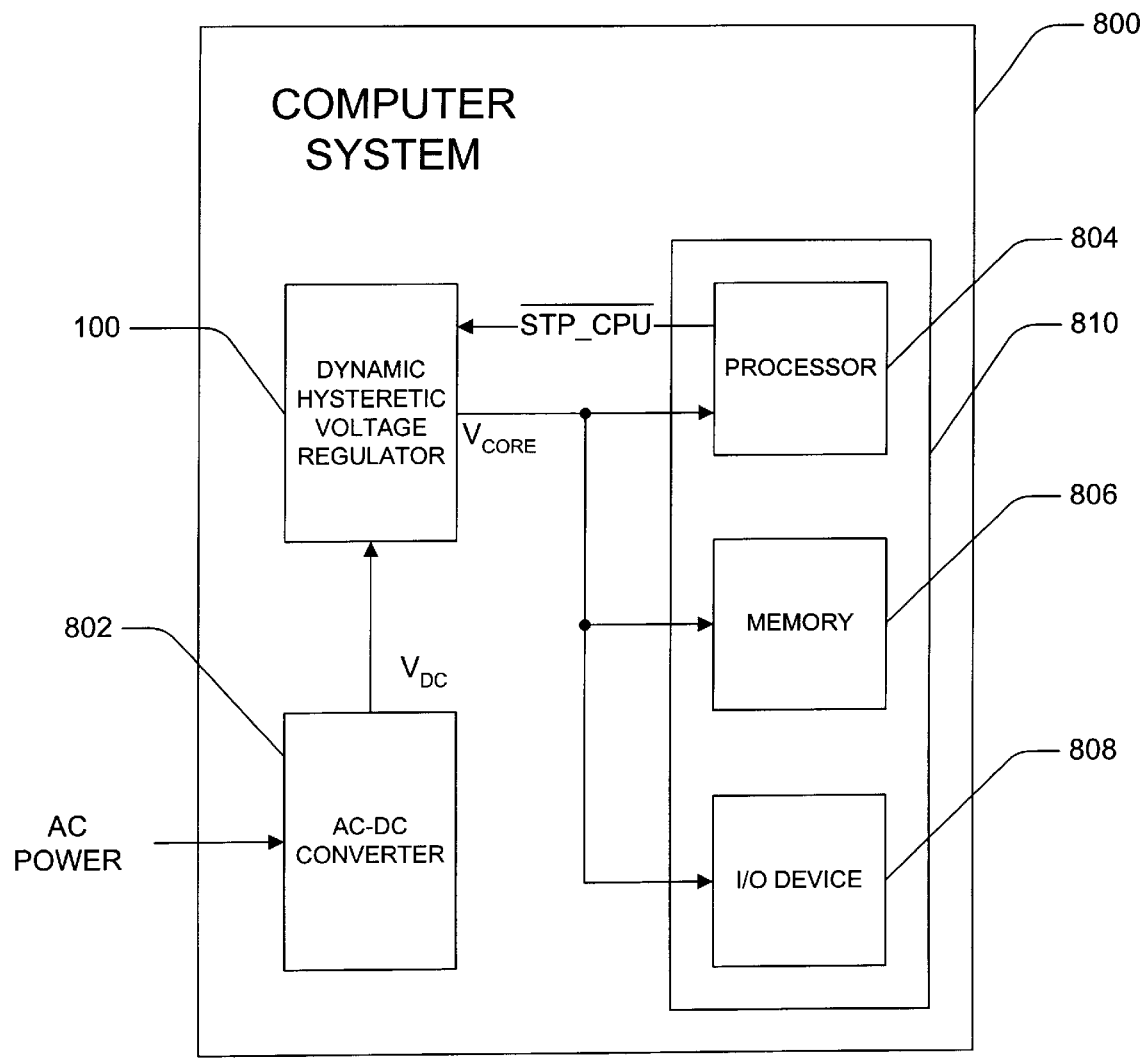
FIG. 8 is a block diagram of a computer system that includes a dynamic hysteretic-mode voltage regulator.

A block diagram of a computer system 800, such as a battery-powered portable computer, is shown in FIG. 8. In some embodiments, the computer system is a file server, a mainframe computer, or other electrical device. The computer system 800 includes a dynamic hysteretic voltage regulator 100, which controls the switching frequency by varying the hysteresis level in response to a load indication signal, $\overline{STP\_CPU}$. The voltage regulator 100 receives a DC input voltage and outputs a regulated DC output voltage. The computer also includes an AC-to-DC power converter 802, a processor 804, a memory 806, and I/O devices 808, such as display devices and disk drives. The processor 804, the memory 806, and I/O devices are representative of a plurality of electronic devices of the computer. These devices are collectively represented as a load 810.

The advantages of the dynamic hysteretic-mode voltage regulator 100 and the switching frequency adjustment process include significant improvement in quiescent power dissipation and easy of implementation. The load indicator requires only one MOSFET switch and two resistors. Further, a computer program residing on a computer readable medium, such as a controller, can implement the adjustment process. The program comprises executable instructions that enable the computer to adjust the voltage ripple or hysteresis level in response to the load indication. other embodiments are within the scope of the following claims. For example, instead of the load indication signal, $\overline{STP\_CPU}$, a load indication circuit can be implemented to directly feed the output load information back to the load indicator. In an alternative embodiment, the load indication signal is fed back directly into the controller which can be modified to receive such a signal.

What is claimed is:

1. A dynamic switching voltage regulator, comprising:
   a load indicator to generate a load signal responsive to different output load conditions of said regulator, where said load signal indicates level of an output voltage;
   at least one switch; and
   a controller configured to receive said load signal, said controller driving said at least one switch at a first switching frequency by adjusting hysteretic level of the output voltage when the output voltage reaches a first level, said controller changing the switching frequency to a second frequency by appropriately adjusting the hysteretic level of the output voltage when the output voltage reaches a second level, such that the change in the switching frequency optimizes quiescent power dissipation of the voltage regulator.

2. The regulator of claim 1, further comprising;
   a drive circuit disposed between said controller and said at least one switch, said drive circuit operating to supply sufficient power to drive said at least one switch at the switching frequency.

3. The regulator of claim 1, further comprising:

an output filter coupled to said at least one switch, said output filter supplying a regulated DC voltage to an output load.

4. The regulator of claim 3, wherein said output filter supplies the regulated DC voltage by charging and discharging energy supplied by said at least one switch.

5. The regulator of claim 4, wherein said output filter includes an inductor and a capacitor, said controller charging the inductor with a transferred energy from said at least one switch and discharging that energy through the capacitor.

6. The regulator of claim 5, wherein said output filter further includes a feedback resistor, said feedback resistor operating to inform said controller about an output load current.

7. The regulator of claim 6, wherein the controller changes the switching frequency of said at least one switch by adjusting an output ripple voltage level.

8. The regulator of claim 7, wherein the controller sets the output ripple voltage level in proportion to the output load current.

9. The regulator of claim 1, wherein the controller changes the switching frequency of said at least one switch by adjusting an output ripple voltage level.

10. The regulator of claim 9, wherein the controller increases the switching frequency by decreasing the output ripple voltage level in response to the change in said load signal from a heavy to light load.

11. A variable ripple-mode switching regulator, comprising:

a plurality of switches;

a load indication circuit generating a load signal indicating an output load condition of the regulator; and a controller configured to adjust an operating switching frequency by varying an output ripple voltage level, said controller dynamically varying said ripple voltage level according to said load signal.

12. The regulator of claim 11, wherein the controller increases the switching frequency by decreasing the output ripple voltage level in response to a change in said load signal from a heavy to light load.

13. A method for controlling an operating switching frequency of switches in a voltage regulator, comprising:

receiving an output load indication signal; and adjusting said operating switching frequency in response to a change in said output load indication signal, where said operating switching frequency is adjusted by appropriately varying the hysteresis level of an output voltage.

14. The method of claim 13, wherein said adjusting said operating switching frequency includes driving the operating switching frequency at a first frequency by accordingly adjusting hysteresis level of an output voltage, if the load signal indicates a heavy output load, or driving the operating switching frequency at a second frequency higher than the first frequency, if the load signal indicates a light output load.

15. The method of claim 14, further comprising:

monitoring an output load current; and adjusting the hysteresis level in proportion to said output load current.

16. A computer program, residing on a computer readable medium, the program comprising executable instructions that enable the computer to:

receive an output load indication signal; and adjust said operating switching frequency in response to a change in said output load indication signal, where said operating switching frequency is adjusted by appropriately varying the hysteresis level of an output voltage.

17. A computer system, comprising:

an AC-to-DC converter receiving AC power, said converter converting AC power to DC power, and generating a DC voltage;

a processor operating to generate an output load indication signal; and a dynamic ripple-mode voltage regulator having an operating switching frequency, said regulator configured to receive the DC voltage generated by said AC-to-DC converter, said regulator outputting a regulated DC voltage by dynamically changing said switching frequency, said switching frequency dynamically changed by appropriately adjusting a ripple level of an output voltage in response to an output load indication signal.

18. The computer system of claim 17, wherein said voltage regulator increases the operating switching frequency by decreasing the output ripple voltage level in response to a change in said load indication signal from heavy to light load.

19. The computer system of claim 17, further comprising:

a memory; and input/output devices coupled to said voltage regulator, said input/output devices, processor and memory configured to receive the regulated DC voltage, and collectively provide an output load to said voltage regulator.

* * * * *